United States Patent
Tazume

(10) Patent No.: US 12,248,899 B2
(45) Date of Patent: Mar. 11, 2025

(54) LOGISTICS MANAGEMENT SYSTEM, LOGISTICS MANAGEMENT METHOD, AND PROGRAM

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/926,908

(22) PCT Filed: Oct. 27, 2021

(86) PCT No.: PCT/JP2021/039688
§ 371 (c)(1),
(2) Date: Nov. 21, 2022

(87) PCT Pub. No.: WO2023/073836
PCT Pub. Date: May 4, 2023

(65) Prior Publication Data
US 2024/0232784 A1    Jul. 11, 2024

(51) Int. Cl.
*G06Q 10/04* (2023.01)
*G06Q 10/047* (2023.01)
*G06Q 10/083* (2023.01)
*G06Q 10/08* (2024.01)

(52) U.S. Cl.
CPC ......... *G06Q 10/083* (2013.01); *G06Q 10/047* (2013.01)

(58) Field of Classification Search
CPC ...... G06Q 10/04; G06Q 10/047; G06Q 10/08; G06Q 10/083
See application file for complete search history.

(56) References Cited

U.S. PATENT DOCUMENTS

| 2015/0120600 | A1* | 4/2015 | Luwang | G06Q 10/08355 |
| | | | | 705/338 |
| 2019/0156672 | A1* | 5/2019 | Konishi | G08G 1/20 |
| 2020/0097890 | A1 | 3/2020 | Migita | |
| 2023/0136829 | A1* | 5/2023 | Zhang | G06Q 10/08355 |
| | | | | 705/7.26 |

FOREIGN PATENT DOCUMENTS

| EP | 3 633 566 A1 | 4/2020 |
| WO | 2018/216502 A1 | 11/2018 |

OTHER PUBLICATIONS

International Search Report of PCT/JP2021/039688 dated Jan. 25, 2022 [PCT/ISA/210].

* cited by examiner

*Primary Examiner* — Tan Q Nguyen
(74) *Attorney, Agent, or Firm* — Sughrue Mion, PLLC

(57) ABSTRACT

A logistics management system includes a memory that stores operation record information indicating a record of each of users operating an unmanned vehicle and a circuitry. The circuitry is configured to specify, when the unmanned vehicle moves on a carrying route that includes carrying points, a user who operates the unmanned vehicle at each of the carrying points, obtain the operation record information corresponding to the specified user, and specify, based on the operation record information, an estimated operation time for each of the users to operate the unmanned vehicle and determine a carrying sequence using the estimated operation time. The carrying sequence is a sequence in which the unmanned vehicle moves between the carrying points on the carrying route.

12 Claims, 10 Drawing Sheets

Fig.2

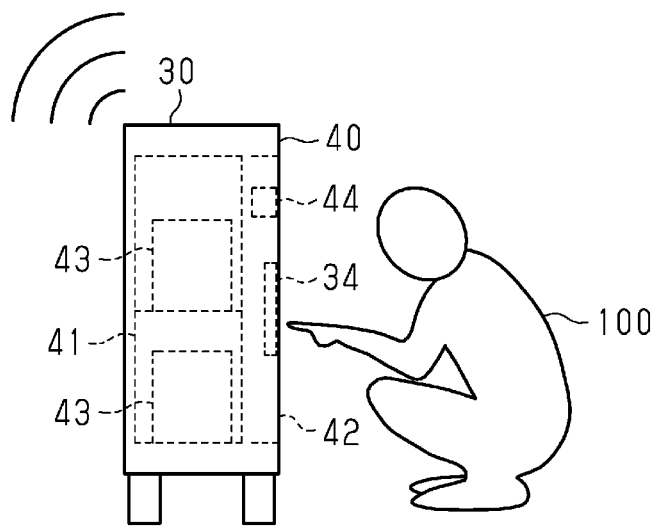

Fig.3

| User ID | Address | Notification Information | Operation Record Information ||||||
|---|---|---|---|---|---|---|---|---|
| | | | Unmanned Ground Vehicle A ||| Unmanned Ground Vehicle B |||
| 001 | *** | *** | Yes | First Time | 10 Mins | Yes | First Time | 3 Mins |
| | | | | Second Time | 8 Mins | | | |
| 002 | | | No |||  Yes | First Time | 2 Mins |
| ⋮ | ⋮ | ⋮ | ⋮ | ⋮ | ⋮ | ⋮ | ⋮ | ⋮ |

Fig.4

| Package ID | User ID | Address | Requested Time Period | Order ID | Notification Status | Carrying Status |
|---|---|---|---|---|---|---|
| *** | 011 | *** | 09:00~10:00 | *** | Arrival Notification | Not Carried |
| *** | 020 | *** | 14:00~15:00 | *** | Schedule Notification | Carried |
| ⋮ | ⋮ | ⋮ | ⋮ | ⋮ | ⋮ | ⋮ |

| Carrying ID | Unmanned Ground Vehicle | Package ID (1) | Package ID (2) | Package ID (3) | Carrying Sequence | Carrying Route | Estimated Arrival Time |
|---|---|---|---|---|---|---|---|
| 0011 | A | *** | *** | *** | A, B, C | *** | *** |
| 0012 | B | *** | *** | *** | D, E, F | *** | *** |
| : | | : | : | : | : | : | : |

52

55 — Record Registration Unit
56 — User Specifying Unit
57 — Operation Record Acquisition Unit
58 — Planning Unit Fig.7
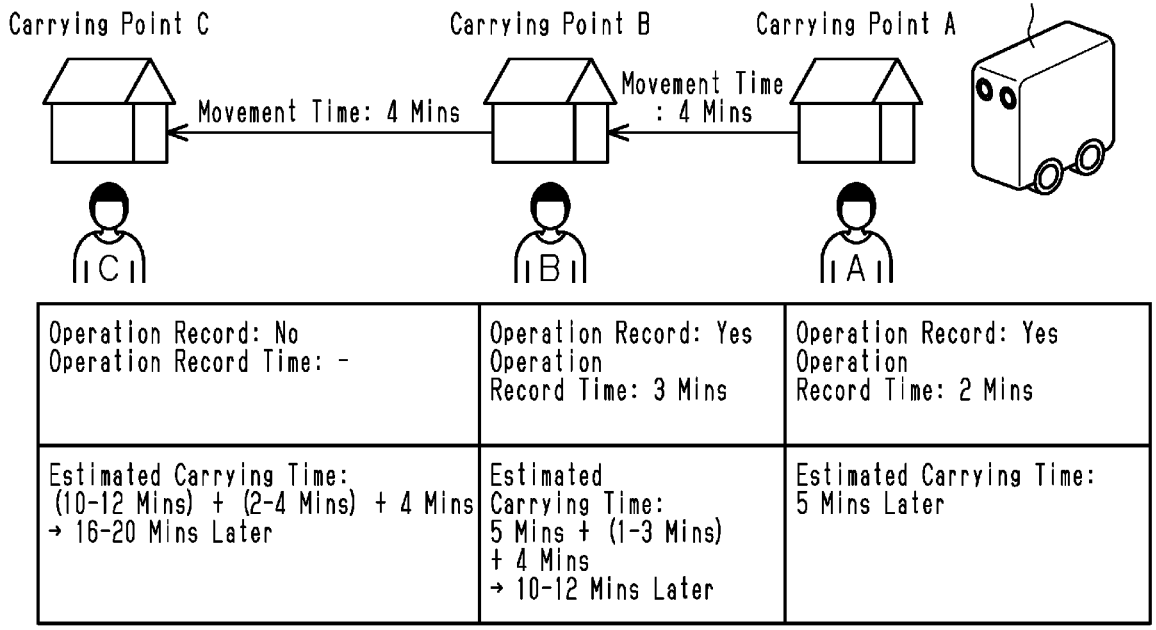
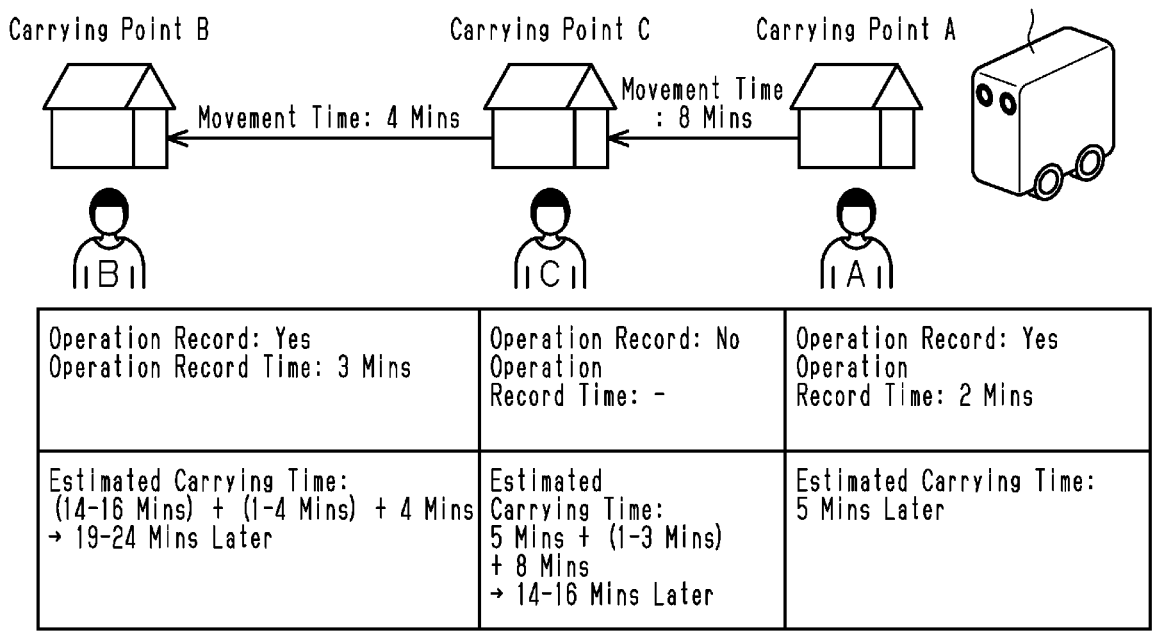

Fig.15

| User ID | Address | Notification Status | Receipt Record Information | Package Collection Record Information |
|---|---|---|---|---|
| 001 | *** | *** | *** | *** |
| 002 | *** | *** | *** | *** |
| : | : | : | : | : |

| Unmanned Ground Vehicle A | | | Unmanned Ground Vehicle B | | |
|---|---|---|---|---|---|
| Yes | First Time | 9 Mins | Yes | First Time | 5 Mins |
| | Second Time | 8 Mins | | | |

LOGISTICS MANAGEMENT SYSTEM, LOGISTICS MANAGEMENT METHOD, AND PROGRAM

CROSS REFERENCE TO RELATED APPLICATIONS

This application is a National Stage of International Application No. PCT/JP2021/039688 filed on Oct. 27, 2021.

TECHNICAL FIELD

The present disclosure relates to a logistics system, a logistics management method, and a program.

BACKGROUND

Logistics systems used to deliver an item to a recipient using an unmanned vehicle (e.g., unmanned ground vehicle or unmanned aerial vehicle) have been in practical use. Flexible response is more difficult for delivery using an unmanned vehicle than for manned delivery, in which a delivery person delivers an item. Thus, making a carrying plan necessitates estimation of the time required for delivery by taking into account a variety of factors (e.g., environmental factors such as travel environment and human factors related to a recipient) that affect the time required for the delivery. Patent Literature 1 discloses an example of creating a carrying plan based on a certain working time (e.g., five minutes for package loading and five minutes for a user to receive a package).

CITATION LIST

Patent Literature

Patent Literature 1: PCT Publication No. 2018/216502

SUMMARY OF INVENTION

Technical Problem

Of the variety of factors, the human factors greatly affect the time required for delivery. Thus, it is desirable to create a carrying plan by taking more human factors into account.

Solution to Problem

In an aspect, a logistics management system is provided. The logistics management system includes a memory that stores operation record information indicating a record of each of users operating an unmanned vehicle, a user specifying unit that specifies, when the unmanned vehicle moves on a carrying route that includes carrying points, a user who operates the unmanned vehicle at each of the carrying points, an operation record acquisition unit that obtains the operation record information corresponding to the specified user, and a planning unit that specifies, based on the operation record information, an estimated operation time for each of the users to operate the unmanned vehicle and determines a carrying sequence using the estimated operation time. The carrying sequence is a sequence in which the unmanned vehicle moves between the carrying points on the carrying route.

In another aspect, a logistics management method is provided. In the logistics management method, a controller executes a step of storing operation record information indicating a record of each of users operating an unmanned vehicle, a step of specifying, when the unmanned vehicle moves on a carrying route that includes carrying points, a user who operates the unmanned vehicle at each of the carrying points, a step of obtaining the operation record information corresponding to the specified user, and a step of specifying, based on the operation record information, an estimated operation time for each of the users to operate the unmanned vehicle and determining a carrying sequence using the estimated operation time. The carrying sequence is a sequence in which the unmanned vehicle moves between the carrying points on the carrying route.

In a further aspect, a program is provided. The program causes a controller to execute a step of storing operation record information in a memory, the operation record information indicating a record of each of users operating an unmanned vehicle, a step of specifying when the unmanned vehicle moves on a carrying route that includes carrying points, a user who operates the unmanned vehicle at each of the carrying points, a step of obtaining the operation record information corresponding to the specified user, and a step of specifying, based on the operation record information, an estimated operation time for each of the users to operate the unmanned vehicle and determining a carrying sequence using the estimated operation time. The carrying sequence is a sequence in which the unmanned vehicle moves between the carrying points on the carrying route.

Advantageous Effects of Invention

In the present disclosure, more human factors are taken into account. Thus, a reasonable, efficient carrying plan is created.

BRIEF DESCRIPTION OF DRAWINGS

FIG. 2 is a diagram schematically showing an example of the unmanned vehicle according to the embodiment.

FIG. 3 is a diagram showing the data configuration of user information according to the embodiment.

FIG. 4 is a diagram showing the data configuration of carrying request information according to the embodiment.

FIG. 7 is a diagram showing candidates for the carrying sequence according to the embodiment.

FIG. 15 is a diagram showing the data configuration of user information according to a modification.

DESCRIPTION OF EMBODIMENTS

First Embodiment

Figure 1:
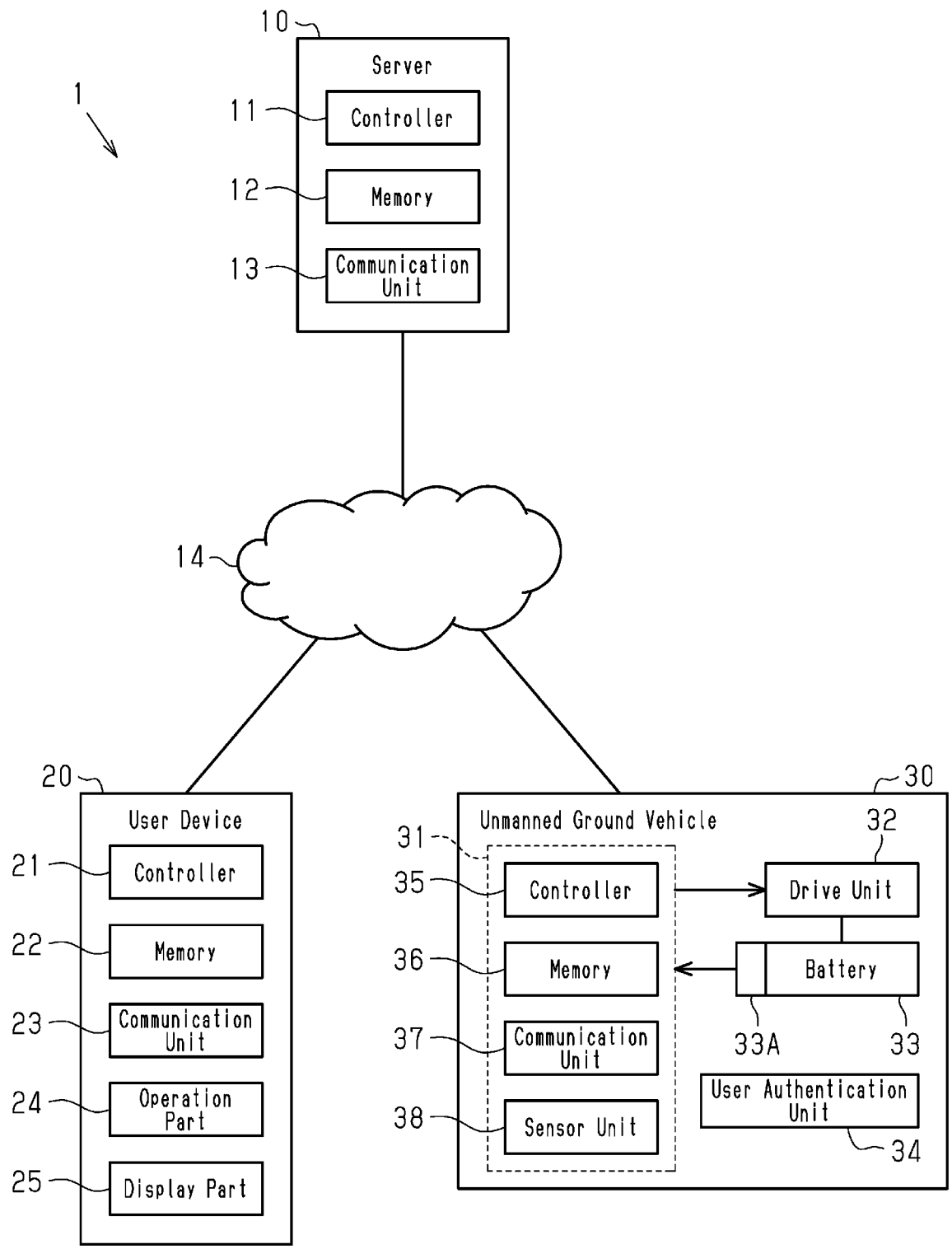
FIG. 1 is a diagram schematically showing the configuration of a logistics management system according to a first embodiment.

A logistics management system, a logistics management method, and a program according to a first embodiment will now be described. In the first embodiment, the unmanned vehicle used by the logistics management system is an unmanned ground vehicle (UGV) that travels on a road.
Logistics System As shown in FIG. 1, a logistics management system 1 includes a server 10, a user device 20, and an unmanned ground vehicle 30. The logistics management system 1 is used to deliver an item to the delivery address of a user (recipient).
Server The server 10 is managed by a logistics manager and includes one or more information processing devices. The server 10 includes a controller 11, a memory 12, and a communication unit 13. The controller 11 includes an arithmetic logic unit and a memory (memory medium). The arithmetic logic unit loads, for example, an operating system and various programs (e.g., logistics management program) into the memory of the controller 11 from the memory 12 or a storage, and executes instructions retrieved from the memory of the controller 11. The arithmetic logic unit may have the following configuration.

(1) Circuitry including one or more processors that run according to a computer program;
(2) Circuitry including one or more dedicated hardware circuits that execute at least part of various processes; or
(3) Circuitry including a combination thereof.

The arithmetic logic unit includes a CPU and a memory (e.g., RAM and ROM). The memory stores program codes or commands configured to cause the CPU to execute processes. The memory, or computer readable medium, includes any type of medium that is accessible by general-purpose computers or dedicated computers. Alternatively, instead of or in addition to the CPU, the arithmetic logic unit may include a dedicated hardware circuit (for example, application specific integrated circuit (ASIC)) that executes hardware processing for at least part of the processes executed by the arithmetic logic unit.

The memory 12 is an auxiliary storage device (memory medium) and includes various types of information used to manage logistics. The communication unit 13 is implemented as hardware, software, or a combination thereof. The communication unit 13 sends and receives data to and from the user device 20 and the unmanned ground vehicle 30 via a network 14. The server 10 may include an operation part or a display part for which a logistics manager or the like performs an input operation.
User Device The user device 20 is an information processing device used by a user of the logistics management system 1. The user device 20 is a multi-functional telephone terminal (e.g., smartphone), a tablet terminal, a personal computer, a wearable computer, or another type of information processing device.

The user device 20 includes a controller 21, a memory 22, a communication unit 23, an operation part 24, and a display part 25. The controller 21 includes an arithmetic logic unit and a memory (memory medium). The arithmetic logic unit and memory have the same hardware configuration as the server 10. The arithmetic logic unit loads, for example, an operating system and various programs (e.g., a program that executes delivery-related processes) into the memory of the controller 21 from the memory 22 or a storage, and executes instructions retrieved from the memory of the controller 21.

The memory 12 has the same hardware configuration as the server 10. The memory 12 may implement a program that executes delivery-related processes. The program may be an application program used only for receiving the offer of delivery services or may be a program that receives the offer of delivery services using a social networking service. Alternatively, the program may be an application program capable of receiving delivery-related notification emails. The communication unit 23 is implemented as hardware, software, or a combination thereof. The communication unit 23 sends and receives data to and from the server 10 via the network 14. The operation part 24 is a touch panel integrated with the display part 25 (e.g., display). Alternatively, the operation part 24 is, for example, an operation button, a keyboard, a mouse, or a controller arranged on a case or the like of the user device 20. The display part 25 outputs various types of images according to an output instruction of the controller 21.
Unmanned Ground Vehicle The unmanned ground vehicle 30 is a movable device without a person onboard. The unmanned ground vehicle 30 is managed by a logistics manager or another owner. The unmanned ground vehicle 30 includes a control device 31, a drive unit 32, a battery 33 (energy source), and a user authentication unit 34. The control device 31 controls the drive unit 32. The drive unit 32 includes, for example, a drive source that is driven by electric power supplied from the battery 33 or a power transmission mechanism that is operated by the power obtained from the drive source. The power transmission mechanism transmits the power of the drive source to wheels. In the present embodiment, the drive source is an electric motor. The drive source may be an engine that is driven by consuming fuel. In this case, instead of the battery 33, a fuel supplying unit that supplies the drive unit 32 with fuel is disposed as the energy source. The unmanned ground vehicle 30 may include a hybrid drive unit 32 equipped with various types of drive sources.

The user authentication unit 34 is an input device that authenticates a user who receives a package. The user authentication unit 34 is at least one of a device for which a user enters a personal identification number (PIN), a device that recognizes a barcode or a two-dimensional code presented, a device that authenticates a user by receiving data from the user device 20, a biometric authentication device that identifies a user by recognizing the fingerprints and irises of the user, or the like. More specifically, the user authentication unit 34 is a touch panel, a camera, a biometric authentication sensor, or the like.

The control device 31 includes a controller 35, a memory 36, a communication unit 37, and a sensor unit 38. The controller 35 has a similar configuration to the controller 11 of the server 10 or the controller 21 of the user device 20. The memory 36 has a similar configuration to the memory 12 of the server 10 or the memory 22 of the user device 20. In addition to an autonomous traveling program, the memory 36 may store various types of information (e.g., map information) that is necessary for autonomous traveling. The communication unit 37 is implemented as hardware, software, or a combination thereof. The communication unit 37 sends and receives data to and from the user device 20 and the unmanned ground vehicle 30 via the network 14. The sensor unit 38 includes a global positioning system (GPS) sensor that detects a current position. The sensor unit 38 may include at least one of an image sensor (camera), a sensor that detects wind direction and wind speed, an acceleration sensor, a gyro sensor, an infrared sensor, a geomagnetic sensor, an altitude sensor, a displacement sensor, and a temperature sensor. The unmanned ground vehicle 30 may also include a microphone and a speaker.

The unmanned ground vehicle 30 may be connected to a manager terminal used by a delivery manager via the network 14. Using the manager terminal, the delivery manager may visually check an image photographed by the unmanned ground vehicle 30 to monitor the state of the unmanned ground vehicle 30.

The controller 35 obtains the remaining capacity of the battery 33 from a remaining capacity detection circuit 33A in the battery 33. The remaining capacity detection circuit 33A of the battery 33 detects the remaining capacity of the battery 33 and outputs it to the controller 35. The controller 35 obtains remaining capacity information from the remaining capacity detection circuit 33A and send it to the server 10 via the communication unit 37. The server 10 manages the state of charge of the unmanned ground vehicle 30.

FIG. 2 shows an example of the structure of the unmanned ground vehicle 30. The unmanned ground vehicle 30 includes a housing 40. The housing 40 includes an accommodation portion 41 and a door 42. The accommodation portion 41 accommodates a package 43 that is to be received by a user 100. The door 42 includes an opening-closing portion 44 used to lock and unlock the door 42. When the user 100 performs an unlocking operation, the opening-closing portion 44 unlocks the door 42. The user 100 receives the package 43 by opening the door 42. When the door 42 is closed, the opening-closing portion 44 locks the door 42. In the example of FIG. 2, the door 42 includes the user authentication unit 34, for which the user enters a PIN. The user 100 enters a PIN on the user authentication unit 34 to unlock the door 42. The unmanned ground vehicle 30 sends an operation record of the user 100 to the server 10.

In the unmanned ground vehicle 30 of FIG. 2, the user 100 unlocks the door 42 by entering a PIN on the user authentication unit 34 of the door 42. The position of the user authentication unit 34 may differ depending on the type of the unmanned ground vehicle 30. Additionally, the methods for notifying the user 100 of a PIN include a method for issuing a notification using the application program implemented in the user device 20, a method for issuing a notification via email, and the like.

As described above, the unlocking method may differ depending on the type of the unmanned ground vehicle 30. Additionally, there may be differences in how to open the door 42 or how to take the package 43 out of the accommodation portion 41 depending on the type of the unmanned ground vehicle 30.

In a case where the user 100 operates the unmanned ground vehicle 30 for the first time, the operation time from unlocking to locking is unknown. Further, the position of the user authentication unit 34, the unlocking method, and the like may differ depending on the type of the unmanned ground vehicle 30. Thus, even if the user 100 is accustomed to operating a specific unmanned ground vehicle 30, the time for the user 100 to operate another unmanned ground vehicle 30 may be longer. In addition to such differences resulting from the type of the unmanned ground vehicle 30, individuals differ in the length of the operation time. For example, irrespective of the type of the unmanned ground vehicle 30, some users operate the unmanned ground vehicle 30 for a relatively long time while others operate the unmanned ground vehicle 30 for a relatively short time.

The inventors carried out test traveling to pay attention to the fact that the time for users to operate the unmanned ground vehicle 30 varies greatly. Further, in order to reduce the divergence between the carrying plan and the carrying record, the inventors obtained the operation records of users from the unmanned ground vehicle 30 and attempted to reflect the operation records on the carrying plan.

Data Configuration

The data stored in the memory 12 of the server 10 will now be described with reference to FIGS. 3 to 5. The memory 12 of the server 10 stores user information 50, carrying request information 51, and carrying plan information 52.

FIG. 3 shows an example of the user information 50. The user information 50 is generated for each user. The users use the logistics management system 1. The user information 50 is generated, for example, when the user completes an initial registration or when an application program for using the logistics management system 1 is implemented in the user device 20. The user information 50 includes a user ID, address, notification information, and operation record information 50A. The user ID is identification information assigned to each user. The address indicates the position of a carrying point, which indicates a location where a package is to be received. The notification information indicates where a notification for a user is sent. For example, when a user receives a push notification via the application program implemented in the user device 20, the notification information includes a registered ID, a device token, and the like associated with the user device 20. Alternatively, when a user receives a notification via email, the notification information includes the user's email address.

The operation record information 50A indicates a record of the user who operated the unmanned ground vehicle 30. The operation record information 50A illustrated in FIG. 3 indicates whether there is an operation record for each type of the unmanned ground vehicle 30. The operation record information 50A is generated every time the unmanned ground vehicle 30 performs carrying. Further, the operation record information 50A stores an operation record time. The operation record time is the amount of time that was required for the user to operate the unmanned ground vehicle 30. For example, the user with user ID 001 has a record of operating an unmanned ground vehicle A twice, the time required for the first receipt is ten minutes, and the time required for the second receipt is eight minutes. Further, this user has a record of operating an unmanned ground vehicle B, and the time required is three minutes.

The type of the unmanned ground vehicle 30 may be classified according to a vehicle type or may be classified according to a user authentication method, the position of the user authentication unit 34, or the like. For example, even if different vehicle types of the unmanned ground vehicle 30 are used, the same type of the unmanned ground vehicle may be registered as long as the same user authentication method is employed.

FIG. 4 shows an example of the carrying request information 51. The carrying request information 51 relates to a request for package carrying. The carrying request information 51 is generated, for example, for each package that is subject to delivery. The carrying request information 51 includes a package ID, user ID, address, requested time period, order ID, notification status, and carrying status. The package ID is information assigned to a package subject to carrying. The user ID indicates a user who receives a package. The address indicates the address of the user. The user ID and address are associated with the user ID and the address of the user information 50, respectively. The requested time period is a time period during which the user wishes to receive a package. The order ID is identification information assigned to an order when the package subject to delivery is ordered at an electronic commerce (EC) site or the like.

The notification status indicates the status of a notification related to carrying. The server 10 sends a notification to the user device 20 at least one of the following points in time: for example, when the server 10 accepts a carrying request; when the unmanned ground vehicle 30 leaves a station (e.g., warehouse); before a predetermined time at which the unmanned ground vehicle 30 will reach a carrying point; and when the unmanned ground vehicle 30 reaches the carrying point. The notification status stores the type of the latest one of notifications sent from the server 10 to the user. The delivery status indicates the carrying status of a package. For example, the carrying status is one of statuses such as "undelivered", "in transit", and "delivered".

Figures 5, 6:
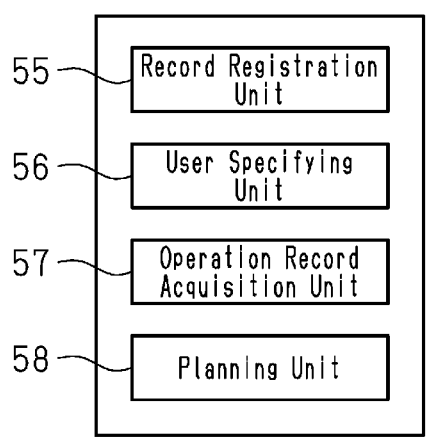
FIG. 5 is a diagram showing the data configuration of carrying plan information according to the embodiment.
FIG. 6 is a block diagram showing the functions of the server according to the embodiment.

FIG. 5 shows an example of the carrying plan information 52. To increase the carrying efficiency, the unmanned ground vehicle 30 moves between carrying points with packages when the unmanned ground vehicle 30 is able to visit the carrying points (i.e., when the unmanned ground vehicle 30 moves on a carrying route that includes the carrying points). The carrying plan information is generated for each of carrying vehicles that move from a departure point (e.g., warehouse or store) through carrying points to a terminal point. The carrying plan information includes a delivery ID, unmanned ground vehicle, package ID, carrying sequence, carrying route, and estimated arrival time. The delivery ID is identification information assigned to a carrying vehicle. The column "unmanned ground vehicle" indicates the type of the unmanned ground vehicle 30. The package ID is the ID of a package that is carried by the carrying vehicle. That is, the carrying plan information 52 includes the same number of package IDs as the number of packages that are carried. The carrying sequence indicates the sequence in which the unmanned ground vehicle 30 passes on a carrying route that includes carrying points when moving on a carrying point that includes the carrying points. The carrying route indicates a route for the unmanned ground vehicle 30, including information related to a waypoint, identification information for a road, and the like. The estimated arrival time is information in which a carrying point is associated with a time at which the unmanned ground vehicle 30 is expected to arrive at the carrying point. For example, 11:00 to 11:30 is associated with a carrying point A, and 11:40 to 12:10 is associated with a carrying point B.

Summary of Creating Carrying Plan

Creating a carrying plan by the logistics management system 1 will now be described with reference to FIG. 6. The logistics management system 1 includes a record registration unit 55, a user specifying unit 56, an operation record acquisition unit 57, and a planning unit 58. In the present embodiment, these functions are enabled by the server 10 executing a program used to create a carrying plan. In the following description, packages each having a different carrying point are assigned to one delivery vehicle.

The record registration unit 55 obtains identification information used to identify a user who operates the unmanned ground vehicle 30 and the operation record time that was used for operating the unmanned ground vehicle 30. Further, the record registration unit 55 regards the received identification information and operation record time as the operation record information 50A corresponding to the user and stores them in the memory 12. The operation record time only needs to indicate a time during which the user operates the unmanned ground vehicle 30. To measure the operation record time, the unmanned ground vehicle 30 starts measuring the operation record time after the user performs an action for the unmanned ground vehicle 30 or after the unmanned ground vehicle 30 enters a predetermined state. Further, the unmanned ground vehicle 30 finishes measuring the operation record time after the user performs an action for the unmanned ground vehicle 30 or after the unmanned ground vehicle 30 enters the predetermined state. More specifically, the operation record time ranges from when input to the user authentication unit 34 is started to when the user receives a package and then closes the door 42 of the unmanned ground vehicle 30. Alternatively, the operation record time ranges from when the user arrives at a parking position for the unmanned ground vehicle 30 to when the user takes the package out and then closes the door 42. The fact that the user has arrived at the parking position is detected by identifying the user's position based on the position information detected by the user device 20, recognizing the user using an imaging device of the unmanned ground vehicle 30, or the like. As another option, the operation record time ranges from when the server 10 sends an arrival notification of the unmanned ground vehicle 30 to the user device 20 to when the user takes the package out and then closes the door 42. In this case, the server 10 may preregister a time for the user to move from his or her home to the parking position for the unmanned ground vehicle 30 and subtract the movement time from the home to the unmanned ground vehicle 30. Alternatively, the operation record time ranges from when the user performs a predetermined operation for the user device 20 to when the user takes the package out and then closes the door 42. For example, the predetermined operation is to issue, on a screen displayed by the application program, a notification indicating that the user has arrived at the parking position for the unmanned ground vehicle 30.

The user specifying unit 56 specifies, when the unmanned ground vehicle 30 moves on a carrying route that includes carrying points, a user who operates the unmanned ground vehicle 30 at each of the delivery points. More specifically, the user specifying unit 56 specifies packages assigned to one carrying vehicle and specifies the user ID with which each package is associated.

The operation record acquisition unit 57 obtains the operation record information 50A corresponding to the user specified by the user specifying unit 56. More specifically, the operation record acquisition unit 57 obtains, from the memory 12, the operation record information 50A of the user information 50 including the specified user ID.

Further, the operation record acquisition unit 57 identifies the type of the unmanned ground vehicle 30 to obtain the operation record information 50A associated with the user and the type of the unmanned ground vehicle 30 that have been specified by the user specifying unit 56. More specifically, the operation record acquisition unit 57 obtains a list of unmanned vehicles, which is a list of unmanned ground vehicles 30 that are available in a time period during which carrying is scheduled. Of the user information 50 including the specified user ID, the operation record acquisition unit 57 obtains, from the memory 12, the operation record information 50A corresponding to the type of the unmanned ground vehicles 30 included in the list of unmanned vehicles.

For each user, the planning unit 58 refers to the operation record information 50A to specify an estimated operation time. The estimated operation time is an estimated time for each user to operate the unmanned ground vehicle 30. Further, the planning unit 58 determines a carrying sequence using the estimated operation time. The carrying sequence is a sequence in which the unmanned ground vehicle 30 moves between the carrying points on the carrying route.

The carrying plan will now be described in detail with reference to FIGS. 7 and 8. In the following description, the unmanned ground vehicle 30 sequentially passes through the carrying point A, where user A receives a package, the carrying point B, where user B receives a package, and then a carrying point C, where user C receives a package, For this carrying vehicle, unmanned ground vehicles 30A, 30B are available as the unmanned ground vehicle 30.

User A has a record of operating the unmanned ground vehicle 30A, and the operation record time is two minutes. User B has a record of operating the unmanned ground vehicle 30A, and the operation record time is three minutes. User C has no record of operating the unmanned ground vehicle 30A. The planning unit 58 generates the candidates for the carrying sequence by rearranging the carrying points A to C. Examples of the candidates for the carrying sequence made by the planning unit 58 include: A, B, C; A, C, B; B, A, C; B, C, A; C, A, B; and C, B, A.

In candidate (1) of FIG. 7, the unmanned ground vehicle 30A passes through the carrying points A, B, and C in order. For the initial carrying point A, the planning unit 58 estimates the movement time based on, for example, the distance from the departure point to the carrying point A. For example, the planning unit 58 estimates that the unmanned ground vehicle 30A will arrive at the carrying point A five minutes after departing the departure point.

Next, the planning unit 58 sets the estimated operation time to a time ranging from the shortest time of operating the unmanned ground vehicle 30 to a time obtained by adding a predetermined time (e.g., one minute) to the operation record time. For example, when the shortest time is one minute and the operation record time is two minutes, the estimated operation time ranges from one to three minutes. Further, the planning unit 58 obtains the movement time from the carrying point A to the carrying point B. The planning unit 58 may set the estimated operation time to a time ranging from a time obtained by subtracting the predetermined time (e.g., one minute) from the operation record time of user A at the carrying point A to a time obtained by adding the predetermined time (e.g., one minute) to the operation record time.

The planning unit 58 calculates an estimated carrying time at which the unmanned ground vehicle 30 will arrive at the carrying point B by adding the estimated operation time (one to three minutes) and movement time (four minutes) to the time elapsed after departing the departure time (five minutes). The estimated carrying time is obtained by estimating the carrying time to arrive at each carrying point from the departure point. For example, the planning unit 58 estimates that the unmanned ground vehicle 30A will arrive at the carrying point B ten to twelve minutes after leaving the departure point.

Then, the planning unit 58 adds the estimated operation time of user B at the carrying point B (two to four minutes) and the movement time of the unmanned ground vehicle 30A between the carrying points A and B (four minutes) to the estimated carrying time to the carrying point B (ten to twelve minutes). For example, the planning unit 58 estimates that the unmanned ground vehicle 30A will arrive at the carrying point C sixteen to twenty minutes after leaving the station.

In the same manner, the planning unit 58 calculates estimated carrying times for other candidates. In candidate (2) of FIG. 7, the unmanned ground vehicle 30A passes through the carrying points A, C, and B in order. The planning unit 58 calculates the estimated carrying time in the same manner as the above candidate (1). As a result, the estimated carrying time at which the unmanned ground vehicle 30A will arrive at the final carrying point C is nineteen to twenty-four minutes after the departure of the station.

Figure 8:
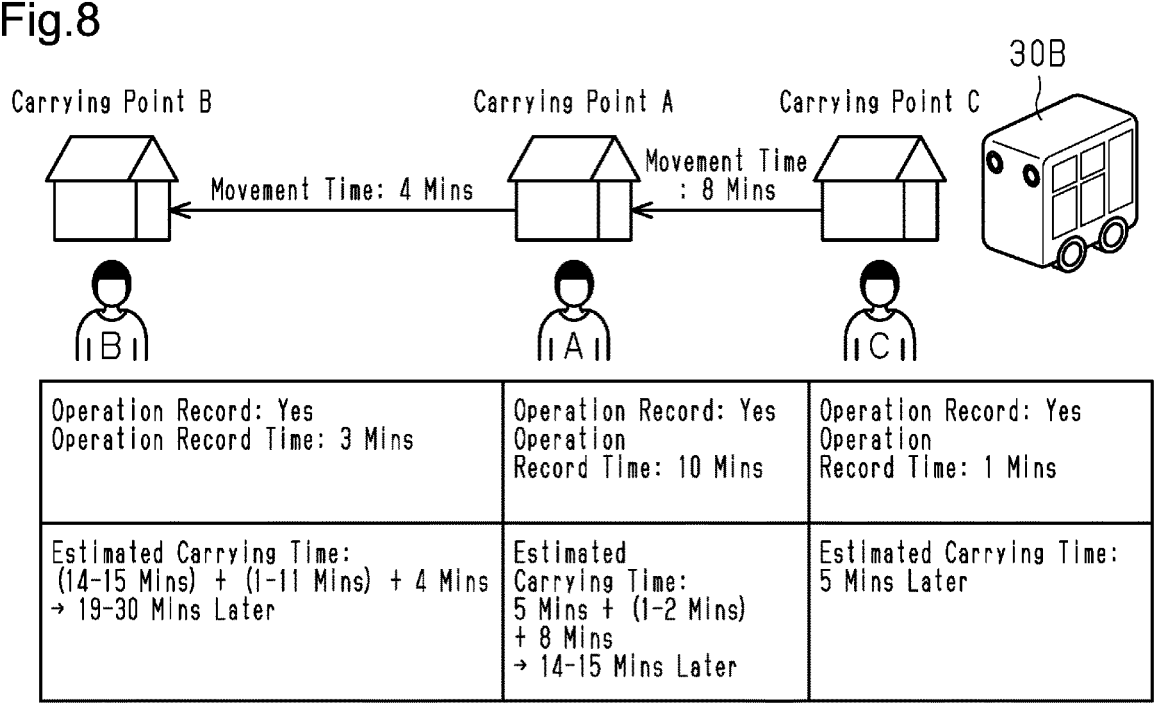
FIG. 8 is a diagram showing a candidate for the carrying sequence according to the embodiment.

As shown in FIG. 8, the planning unit 58 calculates the estimated carrying time for the unmanned ground vehicle 30B in the same manner as the case where the unmanned ground vehicle 30A is used for carrying. For example, for the unmanned ground vehicle 30B, the operation record time of user A is ten minutes, the operation record time of user B is three minutes, and the operation record time of user C is one minute. When the unmanned ground vehicle 30B passes through the carrying points C, A, and then B, the estimated carrying time at the final carrying point B is nineteen to thirty minutes after the departure of the station.

The planning unit 58 provisionally determines to use a carrying route that takes the shortest one of the estimated carrying times at which the unmanned ground vehicle 30 will arrive at the final carrying point of the carrying route. For example, for carrying routes, when the estimated carrying times at which the unmanned ground vehicle 30 will arrive at the final carrying point are sixteen to twenty minutes, nineteen to twenty-four minutes, and nineteen to thirty minutes after the departure of the departure points, the planning unit 58 provisionally determines to use a carrying route that takes sixteen to twenty minutes.

In the above examples, each movement time is fixed. Instead, the movement time may be represented as a time range. For instance, while the movement time between the carrying points A and B is four minutes in the above example, the movement time may range from three to five minutes.

Subsequently, the planning unit 58 uses the estimated operation time associated with the user and the movement time between carrying points to estimate the arrival time in a case where the unmanned ground vehicle 30 moves in accordance with the provisionally determined carrying sequence.

More specifically, from the above candidates, the planning unit 58 first provisionally determines to use a candidate having the shortest one of the estimated carrying times, at which the unmanned ground vehicle 30 will arrive at the final carrying point. After provisionally determining the carrying sequence, the planning unit 58 calculates the estimated arrival time at each carrying point based on the carrying sequence, the departure time of the unmanned ground vehicle 30, and the like. Then, the planning unit 58 determines whether the estimated arrival time is included in the requested time period for the user. For example, when the estimated arrival time at the carrying point A is 10:30 to 11:00 and the requested time period for user A is 10:00 to 11:00, the planning unit 58 determines that the estimated arrival time is included in the requested time period for user A. When the estimated arrival time at the carrying point A is 10:30 to 11:00 and the requested time period for user A is 9:00 to 10:00, the planning unit 58 determines that the estimated arrival time is not included in the requested time period.

In addition, when the estimated arrival time is included in the requested time period for the user, the planning unit 58 registers the estimated arrival time and the carrying route to the carrying plan information 52. When the estimated arrival time is not included in the requested time period, the planning unit 58 changes the carrying sequence.

Additionally, the planning unit 58 excludes a candidate for the carrying sequence in which the number of times the unmanned ground vehicle 30 has passed through a predetermined point exceeds an upper limit number of times. More specifically, the planning unit 58 excludes a carrying route in which the number of times the unmanned ground vehicle 30 has passed through the predetermined point exceeds the upper limit number of times. Alternatively, the planning unit 58 excludes a carrying route that apparently makes the unmanned ground vehicle detour when moving between carrying points.

Procedure for Processes of Determining Pickup Location

The procedure for processes of creating the carrying plan according to the present embodiment will now be described. In the present embodiment, the processes are executed by the server 10.

First, a prerequisite process for the carrying plan will now be described. From an unmanned ground vehicle 30 that is currently carrying or has finished carrying, the record registration unit 55 receives a user's operation record time and identification information used to identify the user who performed the operation. Further, the record registration unit 55 stores the operation record time in the user information 50 corresponding to the received identification information of the user. For the user information 50 in which no operation record time is stored, the record registration unit 55 changes the operation record from "No" to "Yes" and then stores the operation record time.

The server 10 receives, from the user device 20 or an external server, a request for carrying a package using the unmanned ground vehicle 30 and then stores it in the memory 12 as the carrying request information 51.

To create a carrying plan, the server 10 obtains, from the memory 12, the carrying request information 51 that is not included in the carrying plan. Further, the server 10 determines whether there is a carrying request in which the carrying points are relatively close to each other and the carrying is scheduled in the same time period. That is, the server 10 determines whether one carrying vehicle is able to carrying packages to multiple carrying points. When determining that the carrying vehicle is able to deliver packages to multiple carrying points at one time, the server 10 generates the carrying plan information 52 and assigns delivery IDs.

Figure 9:
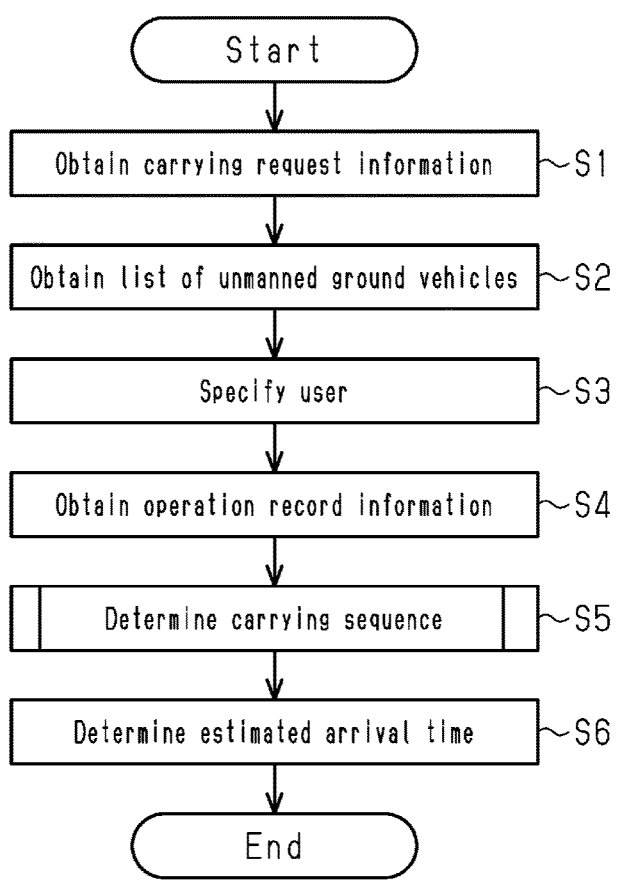
FIG. 9 is a flowchart illustrating a procedure for creating the carrying plan according to the embodiment.

The procedure for creating the carrying plan will now be described in detail with reference to FIG. 9. The user specifying unit 56 obtains, from the memory 12, carrying plan information 52 for which the carrying plan is determined (step S1). That is, the user specifying unit 56 obtains carrying plan information 52 that does not include the carrying sequence, carrying route, or estimated arrival time. Then, the user specifying unit 56 obtains a list of unmanned vehicles from the memory 12 or an external storage (step S2). The list of unmanned vehicles is a list of unmanned ground vehicles 30 that can be used for carrying. For example, the list of unmanned vehicles includes types of the unmanned ground vehicles 30 that are currently waiting.

The user specifying unit 56 specifies a user who will receive a package (step S3). More specifically, the user specifying unit 56 obtains a user ID that corresponds to a package ID included in the carrying plan information 52.

The operation record acquisition unit 57 obtains the operation record information 50A corresponding to the user specified by the user specifying unit 56 (step S4). In this step, the operation record acquisition unit 57 obtains, from the user information 50, the operation record information 50A of the user specified in step S3. The operation record acquisition unit 57 obtains the latest set of the operation record information 50A of multiple sets of the operation record information that corresponds to an unmanned ground vehicle included in the list of unmanned vehicles.

The planning unit 58 determines the carrying sequence based on the operation record information 50A (step S5) and determines the estimated arrival time based on the determined carrying sequence (step S6).

Figure 10:
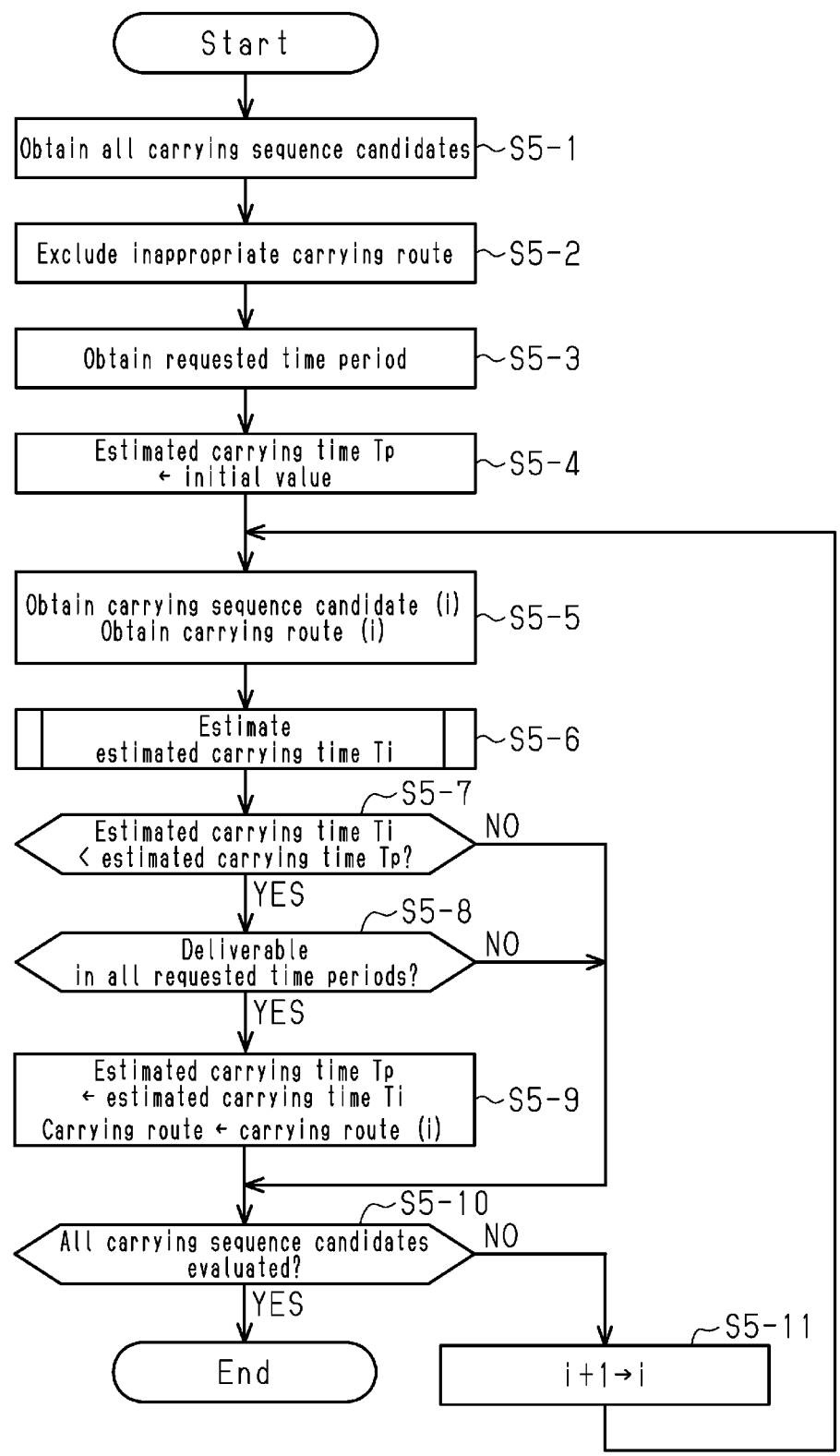
FIG. 10 is a flowchart illustrating a procedure for determining the carrying sequence according to the embodiment.

The process of determining the carrying sequence (step S5) by the planning unit 58 will now be described in detail with reference to FIG. 10. The planning unit 58 obtains all the candidates for the carrying sequence (step S5-1). More specifically, the planning unit 58 rearranges the carrying points included in the carrying plan information 52 and treats them as the candidates for the carrying sequence.

Next, the planning unit 58 excludes an inappropriate one of the carrying routes that correspond to the candidates obtained in step S5-1 (step S5-2). For example, the planning unit 58 excludes a candidate in which the number of times the unmanned ground vehicle 30 has passed the predetermined point on the carrying route exceeds the upper limit number of times. The predetermined point is, for example, an intersection on the carrying route or a point in front of a predetermined facility. The upper limit number of times is, for example, three times. When the unmanned ground vehicle 30 passes through the predetermined point three times or more, the efficiency of delivery using that route may decrease. In addition, repeated passage of the unmanned ground vehicle 30 may not be preferred for residents or pedestrians around the predetermined point. For this reason, the planning unit 58 excludes a carrying route in which the unmanned ground vehicle 30 repeatedly passes through the predetermined point. Alternatively, when the carrying route includes a point or a zone that needs to be avoided (e.g., construction zone), the planning unit 58 may exclude a candidate that corresponds to the carrying route. After excluding an inappropriate carrying route, the planning unit 58 assigns a candidate number i (i=1 to N) to each candidate for the carrying sequence.

The planning unit 58 refers to the carrying request information 51 to obtain, from the carrying request information 51 associated with the user specified in step S3, the requested time period for the user (step S5-3).

Then, the planning unit 58 initializes variables that are used for creating the carrying plan. More specifically, the planning unit 58 sets an initial value for an estimated carrying time Tp at the final carrying point (step S5-4). The initial value refers to the estimated carrying time for movement on a standard route in which the unmanned ground vehicle 30 passes through carrying points. The standard route is, for example, a route in which the unmanned ground vehicle 30 visits carrying points from those farther from the station. The planning unit 58 calculates the estimated carrying time at the final carrying point of the standard route. For example, when the estimated carrying time is nineteen to forty minutes, the planning unit 58 sets the initial value to forty minutes. Further, the planning unit 58 sets the candidate number i to 1, which is the initial value.

In addition, the planning unit 58 obtains a first carrying sequence candidate (1) and a carrying route (1) corresponding to the carrying sequence candidate (1) from the candidates for the carrying sequence obtained in step S5-1 (step S5-5). In this step, the planning unit 58 searches for the carrying route (1) using a known route searching method with map information and the like.

Next, the planning unit 58 calculates an estimated carrying time T1 of the carrying sequence candidate (1) (step S5-6). Then, the planning unit 58 determines whether the estimated carrying time T1 calculated in step S5-6 is shorter than the estimated carrying time Tp that has been set to the initial value (step S5-7).

When determining that the estimated carrying time T1 is shorter than the estimated carrying time (step S5-6: YES), the planning unit 58 calculates the estimated arrival time at each carrying point on the carrying route (1). Then, the planning unit 58 determines whether the estimated arrival time at each carrying point is included in the requested time period for the user receiving the package at the carrying point (step S5-8). When the estimated arrival time of at least one carrying point is not included in the requested time period (step S5-8: NO), the planning unit 58 proceeds to step S5-10.

When determining that the estimated arrival times at all the carrying points are included in the requested time period for the user receiving the package at the carrying points (step S5-8: YES), the planning unit 58 sets the value of the estimated carrying time T1 to the estimated carrying time Tp (step S5-9). For example, when the estimated carrying time T1 is eighteen minutes, the planning unit 58 sets the estimated carrying time Tp to eighteen minutes.

In addition, the planning unit 58 determines whether the planning unit 58 has evaluated all the carrying sequence candidates (1 to N) (step S5-10). When determining that the planning unit 58 has not evaluated all the carrying sequence candidates (step S5-10: NO), the planning unit 58 increments the candidate number i (step S5-11) and returns to step S5-5.

The planning unit 58 obtains a second carrying sequence candidate (2) and a carrying route (2) corresponding to the carrying sequence candidate (2) (step S5-5). Further, the planning unit 58 calculates an estimated carrying time T2 for the carrying sequence candidate (2) (step S5-6). Then, the planning unit 58 determines whether the estimated carrying time T2 is shorter than the estimated carrying time Tp (step S5-7). When determining that the estimated carrying time T2 is shorter than the estimated carrying time Tp (step S5-7: YES), the planning unit 58 determines whether packages can be delivered to all the users in the delivery requested time period (step S5-8). When determining that the packages can be delivered to all the users in the delivery requested time period (step S5-8: YES), the planning unit 58 sets the estimated carrying time Tp to the estimated carrying time T2 and determines to use the carrying route obtained in the step S5-5 (step S5-9).

In this manner, the planning unit 58 repeats steps S5-5 to S5-10 while incrementing the candidate number (i) until it reaches N. When determining that the planning unit 58 has evaluated all the carrying sequence candidates (step S5-10: YES), the planning unit 58 ends the process of determining the carrying sequence. As a result, a carrying point that corresponds to a user having no operation record and having an indefinite estimated operation time has a later position in the sequence than a carrying point corresponding to a user having an operation record, although it depends on the requested time periods for users. Further, a carrying point corresponding to a user who has a relatively long estimated operation time has a later position in the sequence than a carrying point corresponding to a user who has a relatively short estimated operation time.

Figure 11:
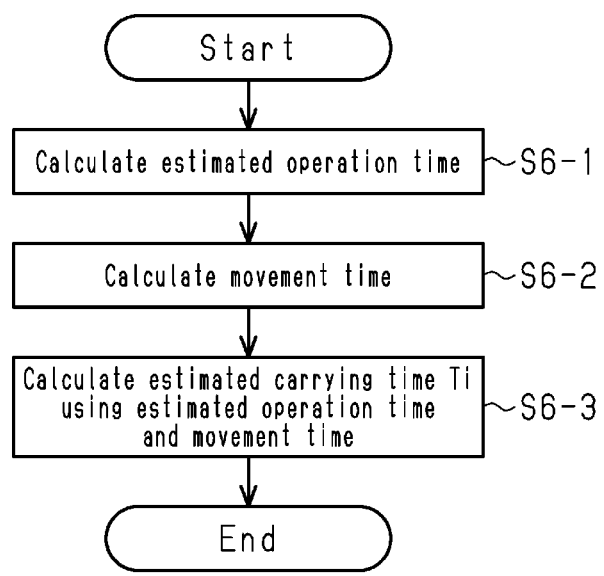
FIG. 11 is a flowchart illustrating a procedure for estimating the maximum time for carrying according to the embodiment.

The process of calculating an estimated carrying time Ti will now be described with reference to FIG. 11.

The planning unit 58 calculates the estimated operation time of a user who corresponds to each carrying point (step S6-1). More specifically, the planning unit 58 sets the estimated carrying time to a time ranging from a time obtained by subtracting a first predetermined time from the operation record time associated with the user to a time obtained by adding a second predetermined time to the operation record time. The first predetermined time may be equal to or different from the second predetermined time. The first and second predetermined times may be determined depending on the length of the operation record time. For example, the first and second predetermined times may be obtained by multiplying, by the operation record time, a predetermined ratio less than 1.

The planning unit 58 calculates the movement time of arriving at the first carrying point from the departure point and the movement time between the carrying points (step S6-2). More specifically, the planning unit 58 calculates the movement time based on the movement distance on a road that connects between the carrying points and the movement speed of the unmanned ground vehicle 30.

Then, the planning unit 58 uses the estimated operation time and movement time to calculate the estimated carrying time Ti (step S6-3). In the present embodiment, the movement time from a finally reached carrying point to a terminal point is not included in the estimated carrying time. More specifically, the planning unit 58 adds the movement time and estimated operation time to the departure time to set the estimated carrying time Ti to a time to reach the finally reached carrying point from the departure point.

After creating a carrying plan, the server 10 sends the carrying plan information 52 to the unmanned ground vehicle 30. An operator equips the unmanned ground vehicle 30 with a package registered in the carrying plan information 52. At the departure time, the unmanned ground vehicle 30 carries the package along the carrying route in accordance with the carrying plan information 52.

The advantages of the first embodiment will now be described.

(1-1) The time for users to operate the unmanned ground vehicle 30 varies greatly. The variations greatly affect an actual time for carrying. In the first embodiment, the operation record information 50A of the unmanned vehicle for each user is stored. Then, the operation record information 50A is used to create the carrying plan. This reduces the divergence between the carrying plan and the carrying record. Such an expected reduction in the divergence between the carrying plan and the carrying record shortens a possible range for the estimated arrival time of which the user is notified.

(1-2) The record registration unit 55 directly obtains the operation record time from the unmanned ground vehicle 30 and thus obtains an accurate operation record for each user.

(1-3) The planning unit 58 determines the carrying sequence such that the expected delivery time for a user is included in the delivery requested time period. This allows for delivery at a time requested by the user.

(1-4) For each type of the unmanned ground vehicle 30, whether there is an operation record is stored. This reduces the divergence between the estimated operation time and the operation record time.

(1-5) The operation record time that was used for operating the unmanned ground vehicle 30 is used to specify the estimated operation time. This reduces the divergence between the estimated operation time and the operation record time.

(1-6) The operation record time ranges from when input to the user authentication unit 34 is started to when the user receives a package and then closes the door 42 of the unmanned ground vehicle 30. Thus, the time that was used for only operating the unmanned ground vehicle 30 is specified.

(1-7) The operation record acquisition unit 57 obtains the latest operation record information 50A. Thus, when the user gets accustomed to operating the unmanned ground vehicle 30 and thus the operation record time is shortened, the shortened operation record time is used for the carrying plan. This reduces the divergence between the estimated operation time and the operation record time.

(1-8) As a result of comparing between the estimated carrying times of the candidates for carrying sequences, the planning unit 58 sets a later position in the sequence for a user having an indefinite estimated operation time. This reduces the divergence between the carrying plan and the movement record at a position in the sequence prior to a user having an indefinite estimated operation time.

(1-9) As a result of comparing between the estimated carrying times of the candidates for carrying sequences, the planning unit 58 sets a later position in the sequence to a user having a relatively long estimated carrying time that is likely to vary. This reduces the divergence between the carrying plan and the movement record at a position in the sequence prior to a user having an indefinite estimated operation time.

(1-10) The planning unit 58 excludes the candidates for a carrying sequence in which the number of times the unmanned ground vehicle 30 has passed the predetermined point exceeds the upper limit number of times. That is, the planning unit 58 excludes a route that causes the unmanned ground vehicle 30 to change its direction frequently or a route that is relatively long from the departure point to the terminal point of the unmanned ground vehicle 30. This allows for efficient carrying.

Second Embodiment

The logistics management system according to a second embodiment will now be described. In the first embodiment, the carrying sequence determining process (step S5) creates a carrying plan based on a carrying sequence that has the earliest estimated carrying time of a finally reached carrying point. The second embodiment is different from the first embodiment in that the carrying plan is created using a sequence that has the shortest duration of the estimated carrying time of the finally reached carrying point.

Figure 12:
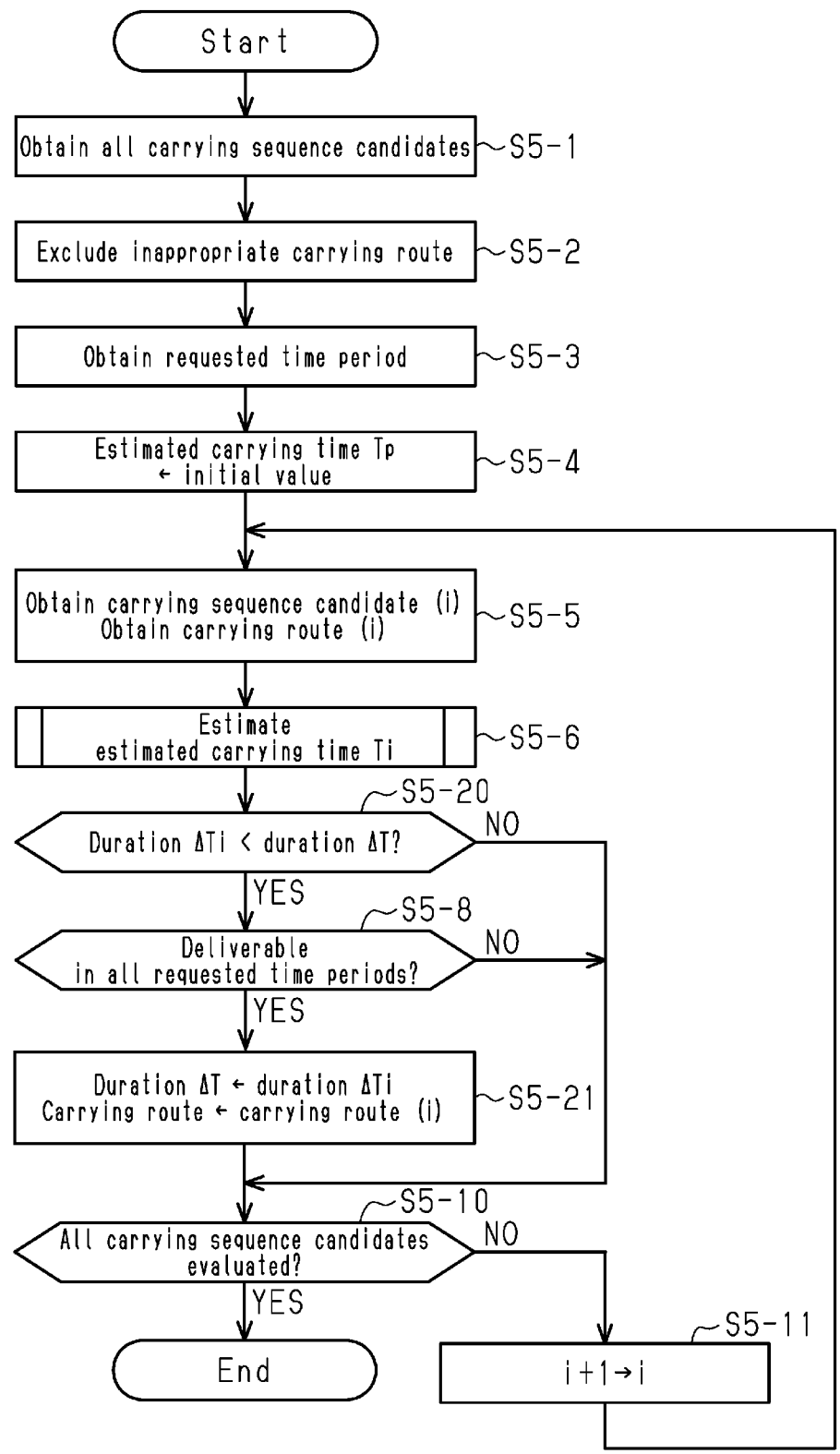
FIG. 12 is a flowchart illustrating a procedure for creating the carrying plan according to a second embodiment.

FIG. 12 shows a procedure for processes of determining the carrying sequence according to the second embodiment. In the second embodiment, the planning unit 58 may calculate, as the estimated operation time, from the shortest time to a time obtained by adding a predetermined time (e.g., one minute) to the operation record time. The planning unit 58 may also calculate, as the estimated operation time, from a time obtained by subtracting the predetermined time from the operation record time to a time obtained by adding the predetermined time to the operation record time. In the latter case, when the operation record time is ten minutes and the predetermined time is one minute, the operation record time ranges from nine to eleven minutes.

In the same manner as the first embodiment, the planning unit 58 executes steps S5-1 to S5-6. The planning unit 58 estimates the estimated carrying time Ti of the carrying sequence candidate (i) (step S5-20). Then, the planning unit 58 determines whether a duration $\Delta Ti$ of the estimated carrying time Ti calculated in step S5-6 is shorter than a duration $\Delta T$ of the estimated carrying time Tp (step S5-21). That is, the planning unit 58 determines whether the estimated carrying time Ti of the carrying point finally reached by the unmanned ground vehicle 30 on the carrying route is shorter than the estimated carrying time Tp of the carrying point finally reached by the unmanned ground vehicle 30 on a standard route.

In the first embodiment, the maximum estimated carrying time Ti is compared with the maximum estimated carrying time Tp. The second embodiment differs from the first embodiment in that the duration of the estimated carrying time Ti is compared with the duration of the estimated carrying time Tp. For example, when the estimated carrying time Ti ranges from 10:00 to 11:00, the duration $\Delta Ti$ is sixty minutes. When the estimated carrying time Ti ranges from 10:00 to 10:30, the duration $\Delta Ti$ is thirty minutes.

When determining that the duration $\Delta Ti$ of the estimated carrying time is shorter than the duration $\Delta T$ of the estimated carrying time Tp as a result of comparison between the durations $\Delta Ti$ and $\Delta T$ (step S5-20: YES), the planning unit 58 calculates the estimated arrival time at each carrying point on the carrying route (i). Then, the planning unit 58 determines whether the estimated arrival time at each carrying point on the carrying route (i) corresponding to the carrying sequence candidate (i) is included in the requested time period for the user (step S5-8).

When determining that the estimated arrival time at each carrying point is included in the requested time period for the user (step S5-8: YES), the planning unit 58 sets the duration $\Delta Ti$ of the estimated carrying time Ti to a comparison duration $\Delta T$ and determines to use the carrying route (i).

When determining that the duration $\Delta Ti$ of the estimated carrying time is longer than the duration $\Delta T$ of the estimated carrying time Tp (step S5-20: YES), the planning unit 58 proceeds to step S5-10 and determines whether all the carrying sequence candidates have been evaluated.

The second embodiment provides the following advantage in addition to advantages (1-1) to (1-11) of the first embodiment.

(2-1) The planning unit 58 determines that the candidate for a carrying sequence having a relatively short duration of the estimated carrying time is used as the carrying sequence of the carrying plan. This shortens a possible range for the estimated arrival time of which the user is notified.

Third Embodiment

The logistics management system 1 according to a third embodiment will now be described. In the first and second embodiments, the estimated carrying times Ti of different carrying sequence candidates are compared with each other to determine an optimal delivery sequence. The third embodiment differs from the first and second embodiments in that the carrying sequence is determined by arranging carrying points from those having shorter operation record times.

Figures 13, 14:
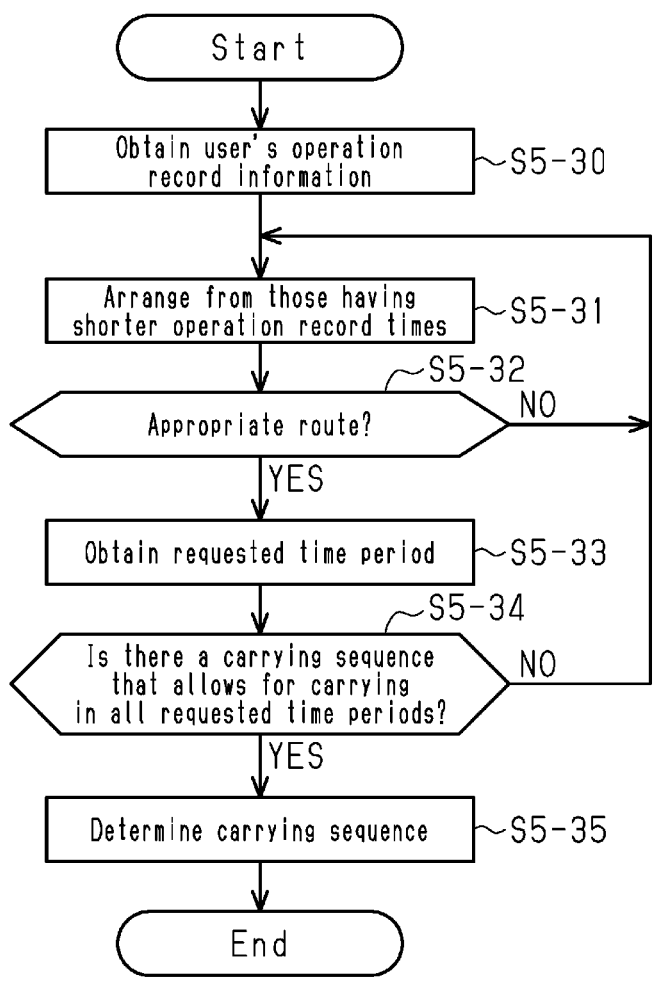
FIG. 13 is a flowchart illustrating a procedure for creating the carrying plan according to a third embodiment.
FIG. 14 is a table in which the receipt record is associated with the estimated operation time according to a modification.

FIG. 13 shows a procedure for processes of determining the carrying sequence according to the second embodiment. The planning unit 58 obtains the operation record information 50A of a user (step S5-30). For example, for the unmanned ground vehicle 30A, the operation record time of user A is five minutes, the operation record time of user B is three minutes, and the operation record time of user C is none. For the unmanned ground vehicle 30B, the operation record time of user A is ten minutes, the operation record time of user B is three minutes, and the operation record time of user C is one minute.

Next, the planning unit 58 arranges carrying points from those having shorter operation record times (step S5-31). For example, the unmanned ground vehicle 30A passes through users B, A, and C in order. The unmanned ground vehicle 30B passes through users C, B, and A in order. A user who has no operation record is treated as a user who has the longest operation record time.

The planning unit 58 searches for a carrying route in accordance with the carrying sequence obtained in step S5-31 and determines whether the carrying route is appropriate (step S5-32). This step is similar to step S5-2. When determining that the carrying route is inappropriate (step S5-8: NO), the planning unit 58 excludes a carrying sequence corresponding to the carrying route determined as being inappropriate. Then, the planning unit 58 returns to step S5-31 to change the sequence of carrying points. For example, the final destination of the unmanned ground vehicle 30A is set to user C, who has no operation record, and the sequence is set to users A, B, and C. Alternatively, a user who has the longest operation record time is set to a final position in the sequence.

Next, the planning unit 58 obtains the requested time period for the user (step S5-33). Then, the planning unit 58 determines whether there is a carrying sequence that allows for carrying in all the requested time periods (step S5-34). In this step, the planning unit 58 calculates the estimated arrival time for the unmanned ground vehicle 30 to arrive at each carrying point in accordance with the sequence specified in step S5-31. Then, the planning unit 58 determines whether the estimated arrival time corresponding to each carrying point is included in the requested time period for the user corresponding to the carrying point. For example, when at least one of the sequence specified based on the operation record time of the unmanned ground vehicle 30A and the sequence specified based on the operation record time of the unmanned ground vehicle 30B matches the requested time period for the user, the planning unit 58 determines that there is a candidate for the carrying sequence that allows for carrying in all the requested time periods (step S5-34: YES) and proceeds to step S5-35. When both of the sequence specified based on the operation record time of the unmanned ground vehicle 30A and the sequence specified based on the operation record time of the unmanned ground vehicle 30B do not match the requested time period for the user, the planning unit 58 determines that there is no candidate for the carrying sequence that allows for carrying in all the requested time periods (step S5-34: NO) and returns to step S5-31.

In step S5-35, the planning unit 58 determines the carrying sequence. That is, when there are multiple candidates for the carrying sequence allowing for carrying in all the requested time periods, the planning unit 58 selects an optimal carrying sequence. In this step, the planning unit 58 may determine that the optimal carrying sequence is a sequence with a relatively short carrying time. Alternatively, the planning unit 58 may determine that the optimal carrying sequence is a sequence in which the estimated carrying time at the finally reached carrying point is the shortest. As another option, the planning unit 58 may determine that the optimal carrying sequence is a sequence in which the unmanned ground vehicle 30 consumes the smallest amount of power.

The third embodiment provides the following advantages in addition to advantages (1-1) to (1-11) of the first embodiment.

(3-1) The planning unit 58 sets a final position in the sequence to a user who has no operation record and has an indefinite estimated operation time. This reduces the divergence between the carrying plan and the movement record at a position in the sequence prior to a user having an indefinite estimated operation time.

(3-2) The planning unit 58 generates the candidates for carrying sequences from those having shorter estimated operation times. Thus, a later position in the sequence is set to a user having a relatively long estimated carrying time that is likely to vary. This reduces the divergence between the carrying plan and the movement record at a position in the sequence prior to a user having an indefinite estimated operation time.

The above embodiments may be modified as follows. The above embodiments and the following modifications can be combined as long as the combined modifications remain technically consistent with each other.

Operation Record Information

In each of the above embodiments, the operation record information 50A includes the operation record time. Instead, the operation record information 50A may include the number of operation records of operating the unmanned ground vehicle 30. The operation record time is expected to decrease in accordance with the number of operation records. FIG. 14 shows a table 60 in which the number of operation records is associated with the estimated operation time. Using the table 60, the planning unit 58 obtains the estimated operation time of the user associated with the number of operation records. The table 60 shows that a shorter estimated operation time is associated with a larger number of operation records. This reduces the divergence between the carrying plan and the carrying record.

Planning Unit

The planning unit 58 does not have to execute the process of determining whether the estimated arrival time at a carrying point is included in the requested time period for a user. In this example, the manager of the logistics management system 1 may use a manager device to determine whether the estimated arrival time at a carrying point is included in the requested time period for the user. When the estimated arrival time at the carrying point is not included in the requested time period for the user, the manager may use the manager device to instruct the planning unit 58 to change the carrying sequence.

Record Registration Unit

The record registration unit 55 may receive various types of information (e.g., information indicating that the arrival of a user at the parking position of the unmanned ground vehicle 30 has been detected and information indicating that an operation by the user has been detected) from the unmanned ground vehicle 30 to calculate the operation record time from the information.

Unmanned Vehicle

The unmanned vehicle may be an unmanned aerial vehicle. The unmanned aerial vehicle is an aerial vehicle without a person onboard. In the same manner as the unmanned ground vehicle 30, the unmanned aerial vehicle includes a control device, a drive unit, a battery, and a user authentication unit. The drive unit includes a drive source that is driven by the electric power supplied from the battery, a rotary wing that is operated by the power obtained from the drive source, and the like. In addition to a program for autonomous flying, the memory of the controller stores various types of information (e.g., map information and carrying plan information). In the same manner as the unmanned ground vehicle 30, the unmanned aerial vehicle includes a housing that accommodates a package, and the housing includes the user authentication unit. In the case of the unmanned aerial vehicle, each user has a different operation record time. Thus, the server 10 of the unmanned aerial vehicle also stores, in the memory 12, the operation record time for each user. In the case of carrying a package using the unmanned aerial vehicle, a carrying plan is created in the same manner as each of the above embodiments to reduce the divergence between the carrying plan and the carrying record. Additionally, carrying may be performed using both the unmanned ground vehicle 30 and the unmanned aerial vehicle. For example, the operation record information 50A of the user information 50 includes the operation records of the unmanned aerial vehicle in addition to those of the unmanned ground vehicle 30. Using the operation record information 50A, the planning unit 58 creates a carrying plan.

Package Carrying Services

In each of the above embodiments, the unmanned ground vehicle 30 delivers a package. Instead of or in addition to this, the unmanned ground vehicle 30 may collect a package. When the unmanned ground vehicle 30 collects a package, the operation record of the unmanned ground vehicle 30 may be operation record information in a case where the package was received. Carrying plans are created in the same manner as the first to third embodiments. Alternatively, as shown in FIG. 15, the user information 50 may include receipt record information and package collection record information as the operation record information. Further, the planning unit 58 may selectively use the receipt record information and package collection record information depending on whether a package is delivered to or collected from the user. For example, the receipt record information is used in the case of delivering a package to the user, and the package collection record information is used in the case of collecting a package from the user. In the same manner as the operation record information of the first embodiment, the package collection record information stores the operation record time of each type of the unmanned ground vehicle 30.

Configuration of Logistics Management System

The logistics management system 1 may include a manager device in addition to the server 10, the user device 20, and the unmanned ground vehicle 30. The manager device is used by a manager who manages the logistics management system or by a manager who manages the unmanned ground vehicle 30. The manager device may be a smartphone (multi-functional telephone terminal), a tablet terminal, a personal computer, a wearable computer, or another information processing device capable of displaying images, and thus has a similar configuration to the user device 20. The manager terminal may be assigned to an unmanned ground vehicle 30 that is currently waiting for the carrying plan information 52.

In each of the above embodiments, the server 10 may function as the record registration unit, user specifying unit, operation record acquisition unit, and planning unit. Instead, the unmanned ground vehicle 30 may execute at least one of these functions. In a case where the unmanned ground vehicle 30 executes some of the processes and the server 10 executes the remaining processes, the unmanned ground vehicle 30 and the server 10 send and receive the results of the processes to and from each other if the results need to be shared.

REFERENCE SIGNS LIST

1) Logistics Management System, 10) Server; 20) User Device; 30) Unmanned Ground Vehicle

The invention claimed is:

1. A logistics management system, comprising:
a memory that stores operation record information indicating a record of each of users operating an unmanned vehicle and
circuitry, wherein the circuitry is configured to:
specify, when the unmanned vehicle moves on a carrying route that includes carrying points, a user who operates the unmanned vehicle at each of the carrying points;
obtain the operation record information corresponding to the specified user; and
specify, based on the operation record information, an estimated operation time for each of the users to operate the unmanned vehicle and determine a carrying sequence using the estimated operation time, wherein the carrying sequence is a sequence in which the unmanned vehicle moves between the carrying points on the carrying route.

2. The logistics management system according to claim 1, wherein the circuitry is configured to obtain, from the unmanned vehicle, identification information that is used to identify a user who operates the unmanned vehicle and information related to the operation record time that was used for operating the unmanned vehicle and store, in the memory, the information related to the operation record time as the operation record information corresponding to the user.

3. The logistics management system according to claim 1, wherein the circuitry is configured to:
estimate an arrival time using the estimated operation time associated with the user and a movement time between the carrying points, the arrival time being estimated in a case where the unmanned vehicle moves in accordance with a provisionally determined carrying sequence;
determine whether the arrival time at each of the carrying points is included in a requested time period for the user associated with the carrying point; and
change the carrying sequence when the arrival time is not included in the requested time period for the user.

4. The logistics management system according to claim 1, wherein
the operation record information includes a type of the unmanned vehicle and information indicating whether there is a record of operation associated with the type of the unmanned vehicle, and
the circuitry is configured to:
specify the type of the unmanned vehicle; and
obtain the operation record information associated with the specified user and the specified type of the unmanned vehicle.

5. The logistics management system according to claim 1, wherein
the operation record information includes an operation record time that was used for operating the unmanned vehicle, and
the circuitry is configured to specify the estimated operation time based on the operation record time.

6. The logistics management system according to claim 5, wherein the unmanned vehicle includes:
- a housing with an accommodation portion that accommodates a package;
- a door used to open and close the accommodation portion; and
- a user authentication unit to which identification information of the user is input, and the operation record time ranges from when input to the user authentication unit is started to when the package is received and then the door is closed.

7. The logistics management system according to claim 1, wherein the circuitry is configured to obtain a latest set of the operation record information when multiple sets of the operation record information associated with the specified user are stored in the memory.

8. The logistics management system according to claim 1, wherein the circuitry is configured to use the operation record information to set a position in a sequence in the carrying route associated with a user having no record of operating the unmanned vehicle to be later than a position in the sequence in the carrying route associated with a user having a record of operating the unmanned vehicle.

9. The logistics management system according to claim 1, wherein the circuitry is configured to set a position in a sequence in the carrying route associated with a user having a relatively long operation record time to be later than a position in the sequence in the carrying route associated with a user having a relatively short operation record time.

10. The logistics management system according to claim 1, wherein the circuitry is configured to exclude a carrying route in which the number of times the unmanned vehicle has passed through a predetermined point exceeds an upper limit number of times.

11. A logistics management method comprising:
- storing operation record information in a memory, the operation record information indicating a record of each of users operating an unmanned vehicle;
- specifying when the unmanned vehicle moves on a carrying route that includes carrying points, a user who operates the unmanned vehicle at each of the carrying points;
- obtaining the operation record information corresponding to the specified user; and
- specifying based on the operation record information, an estimated operation time for each of the users to operate the unmanned vehicle and determining a carrying sequence using the estimated operation time, wherein the carrying sequence is a sequence in which the unmanned vehicle moves between the carrying points on the carrying route.

12. A computer-readable medium that stores a logistic management program for causing one or more computers included in a logistics management system to:
- store operation record information in a memory, the operation record information indicating a record of each of users operating an unmanned vehicle;
- specify, when the unmanned vehicle moves on a carrying route that includes carrying points, a user who operates the unmanned vehicle at each of the carrying points;
- obtain the operation record information corresponding to the specified user; and
- specify, based on the operation record information, an estimated operation time for each of the users to operate the unmanned vehicle and determine a carrying sequence using the estimated operation time, wherein the carrying sequence is a sequence in which the unmanned vehicle moves between the carrying points on the carrying route.

* * * * *